Sept. 24, 1968 R. J. DEBREY ET AL 3,402,836
CONTROL SYSTEM FOR AN AUTOMATIC WAREHOUSE APPARATUS
Filed Nov. 23, 1964 5 Sheets-Sheet 2
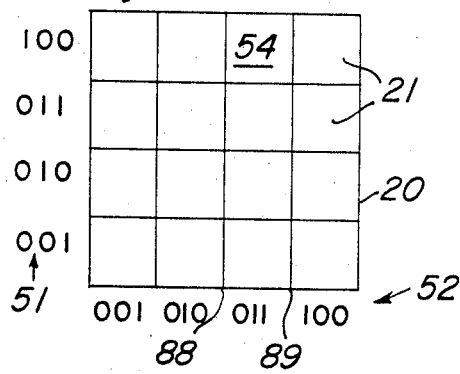
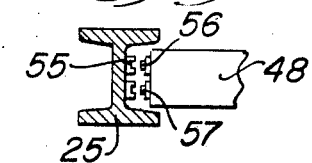
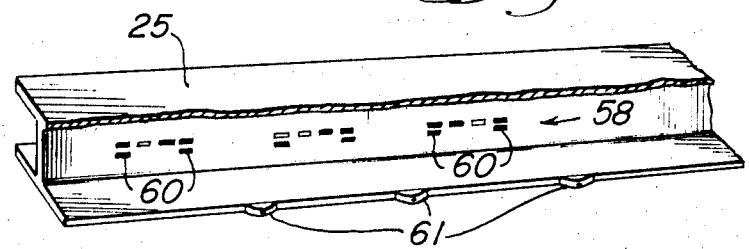
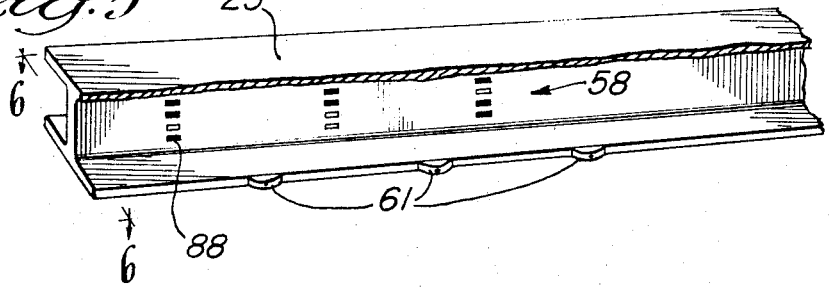
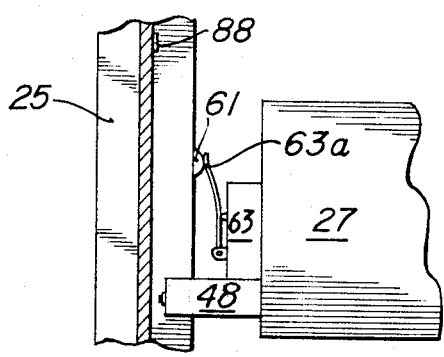

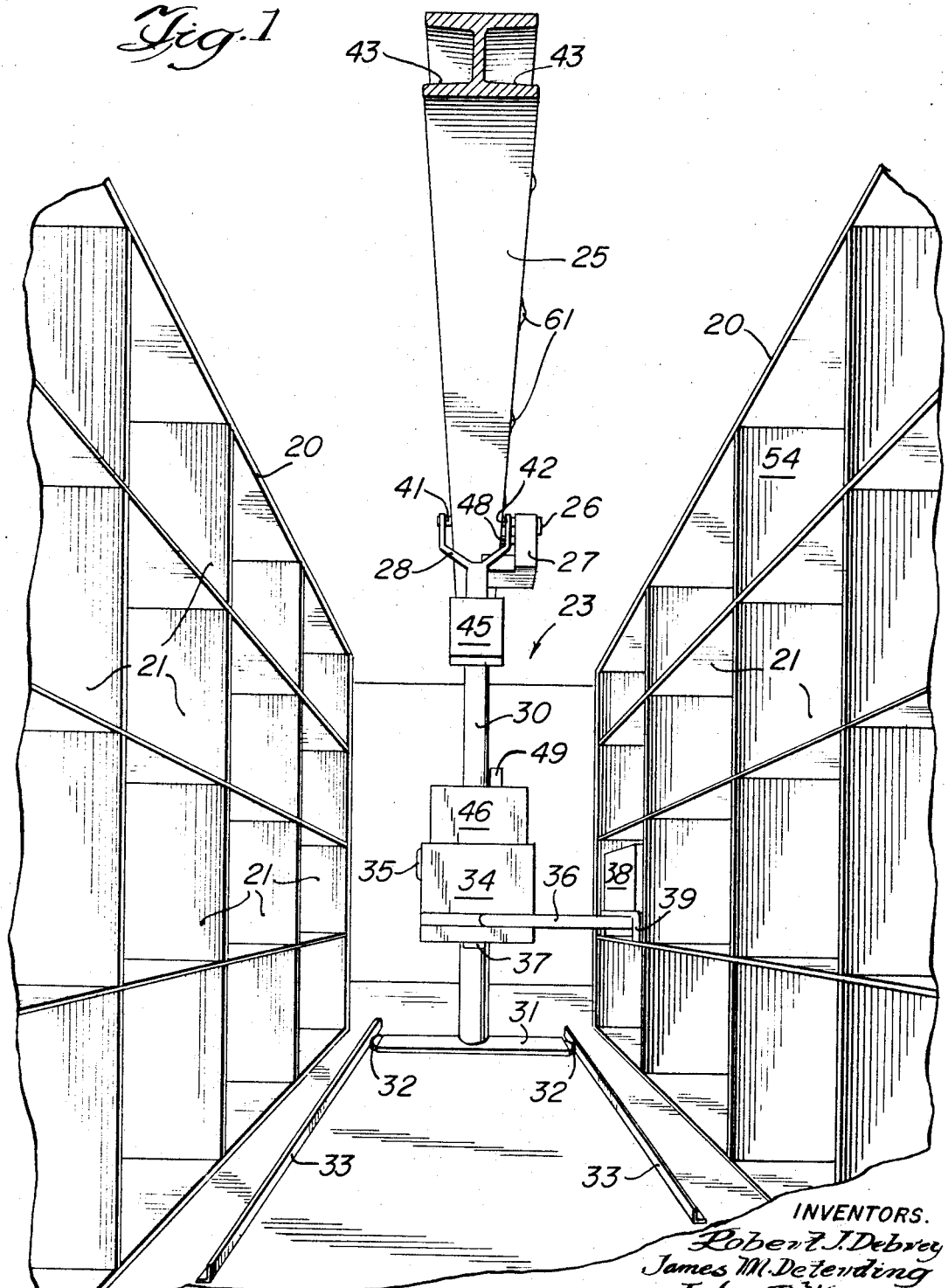

United States Patent Office 3,402,836
Patented Sept. 24, 1968

3,402,836
CONTROL SYSTEM FOR AN AUTOMATIC
WAREHOUSE APPARATUS
Robert J. Debrey, Oak Park, Ill., James M. Deterding, Annapolis, Md., and John R. Weyer, Gary, Ind., assignors, by mesne assignments, to Conco Inc., a corporation of Illinois
Filed Nov. 23, 1964, Ser. No. 413,016
14 Claims. (Cl. 214—16.4)

ABSTRACT OF THE DISCLOSURE

Each bin in a warehouse is uniquely identified by a binary number which locates its position with relation to the remaining bins. A control circuit, storing the address and warehousing function for several bins, moves a stacker crane toward a selected bin by comparing the binary address at which the stacker crane is located with the binary address identifying the selected bins, and stops the stacker crane when a match is found. The stacker crane operates at maximum efficiency by anticipating the final desired location, by determining direction of travel and by handling multiple commands.

---

This invention relates to an automatic warehousing system, and more particularly to a warehousing system utilizable with a storage rack having a plurality of storage bins, the location of each bin being identified and detected by means of unique indicia individually related to each bin.

Various systems have been devised and are in use for warehousing a large number of individual articles. A typical system utilizes a plurality of storage bins, each bin having a counter-operating abutment projecting outwardly therefrom. A self-propelled article conveyor with a memory unit and control apparatus mounted thereon travels to a predetermined bin by counting each bin it passes. The memory unit is usually comprised of a stepping relay which is pulsed to the number of the desired bin. The control apparatus causes the articles conveyor to be propelled along the storage bins, and a limit switch is tripped by each bin abutment, thereby counting down the number stored in the stepping relay. The predetermined bin is reached when the stepping relay has counted down to zero. Similar systems have been devised that count up to the number stored in the stepping relay.

The conventional warehousing system described above has several inherent disadvantages which greatly limit its use in a practical warehousing system, especially those in which an extremely large number of individual bins are used. One problem inherent in prior systems occurs because each individual bin is not uniquely identified. In a counting system it is necessary that the control apparatus operate perfectly throughout the time the article conveyor is searching for a certain predetermined bin. The abutment associated with each bin may be in the form of a mechanical projection, or an equivalent element, such as either a radiant energy field or a passive element for reflecting a radiant energy field. If any one single abutment should be damaged, or the control apparatus should miss a count, the article conveyor will stop at the wrong bin. Aside from the obvious confusion that will result from this mistake, such an error can cause substantial damage to the warehousing system itself. For example, the article conveyor may attempt to deposit an article in a bin that is already full, or the article conveyor may attempt to deposit a large article in a smaller bin, resulting in damage to the article, the bin, or the article conveyor itself. The problem of missing a count is extremely important in practical systems. For example, prior systems have used a reflective element on the bin and a light source and photocell on the article conveyor. In such a system the reflecting element occasionally becomes less reflective so that it fails to reflect the light beam. Furthermore, at times an article is stored that has a reflecting property similar to the reflectors placed on each bin, producing a false count. In other prior systems a mechanical projection has been used which trips a limit switch. At times such a limit switch may strike or otherwise not operate properly, thereby not recording all the projections.

The counting system described above has many other inherent disadvantages. The stepping relay used in the memory has to be individually pulsed to the number of a predetermined bin. In systems employing one hundred or more bins in a row, this may require one hundred or more pulses or a multiplicity of relays. As a result, an extremely large period of time is necessary just to feed the number of the desired bin into the control apparatus. Another problem occurs in existing control systems when it is desired to add increased warehousing capacity. In order to double the number of bins in the warehouse, it is necessary to at least double the complexity of the control circuitry. This results in an extremely large and unnecessary amount of circuitry when a counting control system, conventional heretofore, is used in a large warehousing system.

Some prior systems have counted revolutions of a drive motor rather than actual bins in an attempt to eliminate the necessity for abutments or the problem of missing a count when abutments are used. Such a modified counting system has been even less satisfactory than the system it replaced. One inherent problem in such a modified system is that all the individual bins must be spaced apart by exactly the same distance in order to count an equal number of revolutions for every bin. Because of this limitation, this modified system is not at all acceptable in a warehousing system in which different size bins are used or may be added in the future. Furthermore, large warehousing areas usually require columns or other roof support structures that make it difficult, if not impossible, to have all the storage bins evenly spaced. In addition, such a modified system is inherently inaccurate and the effect of the inaccuracy becomes greater as the distance traveled along the bins increases.

In an automatic warehousing system it is desirable for the article conveyor to be able to perform several functions when it has traveled to a particular set of bins. For example, it may be desirable for the article conveyor to transport a particular article from a receiving station to a bin located at a great distance from the receiving station. Once the article conveyor has reached this bin and deposits the article therein, it may be desirable to transfer another article returning to the receiving station. A counting control system cannot be easily integrated into a logic system for accomplishing the above described operations. In fact, many prior warehousing systems have required the article conveyor to return to a home position for each new instruction, obviously an uneconomical method of operation.

Applicants have invented novel methods and apparatus for automatic warehousing which substantially eliminate all of the inherent disadvantages found in prior systems.

It is a principal object of this invention to provide an improved automatic warehousing system.

Another object of this invention is to provide an automatic warehousing system wherein the location of each storage bin for holding articles is identified by means of unique indicia and the article conveyor locates a desired bin by a matching control system which senses a predetermined indicia as distinct from a counting control system.

One feature of the present invention is a highly reliable control system for a self-propelled article conveyor in which it is immaterial whether unique indicia preceding the predetermined indicia are read correctly by the control system.

Another feature of this invention is the provision of a control system for an article conveyor in which a small increase in control circuitry will double the number of bins that the control system will handle.

Yet another feature of the invention is the provision of one or more memory units for storing the address of a predetermined bin, in which a desired address can be stored in a faster time than heretofore possible.

A further feature of this invention is the provision of an automatic warehousing and bin identification system which will identify bins regardless of varying shapes and sizes and position an article holding means in front of any predetermined bin.

Still a further feature of this invention is the provision of an automatic warehousing system wherein an article conveyor can perform dual or plural operations including a plurality of store, retrieve, or transfer functions without receiving any new commands from an external source.

Further objects and features will become apparent from the following specification and from the drawings in which:

FIGURE 1 is a perspective view of a warehouse including an aisle with spaced apart storage racks and incorporating a stacker crane utilizing the novel features of the applicants' invention;

FIGURE 2 is a diagrammatic representation of a plurality of storage bins whose locations are identified by means of unique indicia in the form of binary numbers;

FIGURE 3 is a cross sectional diagram of the overhead horizontal guide beam with structure attached thereto defining indicia being sensed by a sensing unit;

FIGURE 4 is a fragmentary perspective view of the overhead horizontal guide beam of FIGURE 3, showing binary numbers in serial form for identifying the locations of bins;

FIGURE 5 is a fragmentary perspective view, similar to FIGURE 4, showing the overhead horizontal guide beam with binary numbers in parallel form for identifying the locations of bins;

FIGURE 6 is a fragmentary plan view of a fine position sensor and the overhead horizontal guide means taken along line 6—6 of FIGURE 5;

Figure 7:
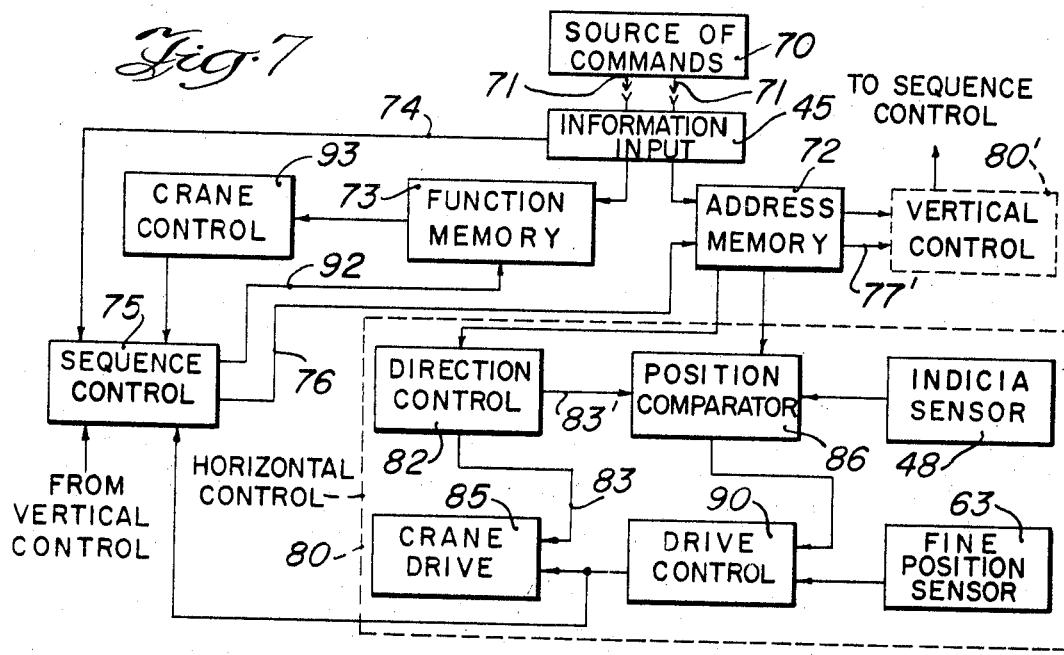
FIGURE 7 is a block diagram of the command apparatus for controlling the operation of the stacker crane shown in FIGURE 1.

While an illustrative embodiment of the invention is shown in the drawings and will be described in detail herein, the invention is susceptible of embodiment in many different forms and it should be understood that present disclosure is to be considered as an exemplification of the principles of the invention and is not intended to limit the invention to the embodiment illustrated. The scope of the invention will be pointed out in the appended claims.

*General operation*

FIGURE 1 illustrates an automatic warehousing system embodying the invention. A number of storage racks 20, each having a plurality of bins 21 for holding articles therein, are arranged in parallel rows in a warehouse. A basic form of article conveyor or article handling device as a stacker crane 23, travels in an aisle between two parallel rows of storage racks 20. The stacker crane 23 is guided in a horizontal direction between the rows by means of an overhead horizontal guide and support rail 25, here an I beam. The stacker crane 23 is propelled along the overhead support rail 25 by a motor 26 contained in a conveyor housing 27 attached to a Y-shaped carriage 28 which is suspended from the rail 25. The motor 26 is bidirectional and has both fast and slow operation in either a forward or reverse direction. The motor 26 can be abruptly stopped by conventional electric braking, which may be supplemented by a mechanical disc brake housed in the unit 27.

A vertical guide means in the form of a column 30 extends from the carriage 28 to a transverse leg member 31 located adjacent the floor of the warehouse. The ends of the leg 31 have rollers 32 which abut rails 33 attached to the floor of the warehouse. The rollers 32 help to guide the stacker crane 23 as it moves horizontally along the rows of storage racks 20. A vertical carriage 34 containing a drive motor 35 is movably attached to the vertical column 30. As an example, the motor 35 drives pinions engaging racks on the column for moving the carriage along the column. Motor 35 is similar to motor 26, having fast and slow speed operation in either a forward or reverse direction. The motor 35 is abruptly stopped by electric braking supplemented with a disc brake housed in carriage 34. An article holding means in the form of a conventional fork lift 36 is mounted on the carriage 34 and can be propelled into and out of the individual bins 21 located on either side of the aisle by an electric motor 37.

The various articles 38 to be stored in the bins 21 are placed on conventional skids 39. When removing an article 38 from its bin, the fork 36 is inserted under the skid 39 by the motor 37. The fork 36 is then raised a slight amount by an upward motion of the carriage 34, and the article 38 is withdrawn from the bin 21 by the retraction of fork 36, as is well known in the art. Similarly, when depositing an article 38 in a bin, the fork 36 is inserted into the bin in a high position. The fork 36 is then lowered a slight amount by a downward motion of the carriage 34, and thereafter retracted, leaving the article in the bin 21.

The stacker crane 23 is designed to handle articles 38 located in bins 21 on either side of the aisle. The fork 36 travels in a slot in carriage 34 that allows the fork 36 to extend from the crane 23 in either a right or left direction as viewed in FIGURE 1. Therefore, a single stacker crane can service two storage racks 20 located on opposite sides of the path of horizontal travel of the crane 23.

The stacker crane 23 is suspended from the horizontal guide rail 25 by means of rollers 41 and 42 that are rotatably mounted on the carriage 28. The rollers 41 and 42 roll over the inner surface 43 of the bottom-most flange of the I beam rail 25. Roller 42 is driven by the motor 26 contained in the conveyor unit 27, and causes horizontal motion of the stacker crane 23.

Power for the motors 26, 35 and 37 can be supplied through conventional parallel bus bars or other techniques (not illustrated). These bus bars can, for example, be located above or attached to the horizontal rail 25, with the unit 27 having a pair of wiper contacts which press against the bus bars to obtain the power for the stacker crane 23.

The stacker crane described is conventional and the detailed construction thereof forms no part of the applicants' invention. Any article conveyor having article holding means that can be positioned to a horizontal and vertical location in space can be used with the applicants' novel matching identification system and control apparatus. For example, the crane may be guided by a pair of rails attached to the top of the storage racks. In such a system the crane would have a T shape, the top-most ends of the T resting on the pair of rails. In other possible systems, only a floor mounted rail or track could be used to guide the stacker crane. For a more complete description of a stacker crane that can be used with the applicants' invention, reference is made herein to the copending application of Fountain and Thompson entitled "Crane Mechanism," filed Oct. 31, 1962, Ser. No. 324,315, and assigned to the assignee of this application. The disclosure contained therein is incorporated herein by reference.

The stacker crane 23 is controlled by means of novel matching control apparatus used jointly with a bin identification system which uniquely identifies the location of individual bins 21. External control information is fed into an information input unit 45 attached to the vertical column 30. The logic control unit 46 for positioning the article holding fork 36 at a predetermined bin is housed on the vertical carriage 34.

Bin identification system

Each bin 21 is provided with a unique address for locating only that particular bin in the rack 20. These addresses are formed from a combination of indicia. In the preferred form of the invention, the indicia forms a binary code.

Each bin could have attached thereto indicia or structure representing a unique binary number. However, it is desirable for the forks 36 of the stacker crane 23 to be able to move simultaneously in both a vertical and horizontal direction while traveling to a predetermined bin. Therefore, in the preferred embodiment of this invention, each bin is indirectly located by identifying its vertical and horizontal location in the rack 20. In the case of horizontal travel, indicia representing the binary codes may be attached to the overhead rail 25 or any other member which is fixedly positioned relative to the bins 21. The indicia representing the vertical binary codes may be attached directly to the vertical column 30. The location of the fork 36 is determined by means of a horizontal sensing unit 48 and a vertical sensing unit 49 which read the binary codes for identifying the bins 21. Since the sensing units 48 and 49 are not attached to the fork 36, but rather to members that always move in a straight path regardless of the position of the fork 36, the address system is essentially independent of the bin 21, and consequently it is possible to have simultaneous horizontal and vertical coordinate positioning of the fork 36 to a location in space that corresponds to the location of the predetermined bin. The operation of these sensing units in conjunction with the binary code bin identification system will now be described.

In FIGURE 2, a plurality of storage bins 21 in a storage rack 20 are diagrammatically illustrated. Each bin is located in a two dimensional co-ordinate system by means of binary numbers. The binary numbers located in series 51 indicate the vertically disposed row at which the storage bin is located. The binary numbers located in series 52 indicate the column of the storage bin. For example, a specific storage bin 54, also identified in FIGURE 1, would be identified in the storage rack 20 by means of the vertical binary number 100 and the horizontal binary number 011. Each bin 21 is therefore located in storage rack 20 by means of two binary numbers which are unique to that particular bin. In FIGURE 2, the binary numbers are composed of only three bits, e.g. 011. A three bit number allows eight rows or columns to be identified, viz zero through seven, as is well known in the art. It is preferable not to use the binary number corresponding to zero, since, as will appear, it cannot be easily identified. Therefore, a three bit number is used to identify seven rows or columns and an $n$ number of bits is used to identify $2^n-1$ rows or columns. The binary numbers actually used in a practical warehousing system would have as many bits as necessary for the number of horizontal and vertical locations to be identified. For example, a specific rack 120 bins long might have bins stacked 6 high. A binary number for vertical identification would therefore be comprised of three bits, while the horizontal binary number would be comprised of seven bits. If the warehouse was expanded and the number of horizontal bins doubled, for example, only one more bit would be needed.

Since each bit of a binary number is composed of only two basic digits, namely, zero and one, such basic digits can be represented by means of any type of device having an "ON" or "OFF" characteristic that can be detected. For example, the presence or absence of a digit could be indicated by a projecting pin detected by a proximity switch. In the preferred embodiment of this invention, a one or ON condition is indicated by the presence of a magnetic field, and a zero or OFF condition is represented by the absence of a magnetic field. Each bit of binary number can therefore be indicated by the presence or absence of a small permanent magnet 55 as illustrated in FIGURE 3. These permanent magnets 55 are attached in appropriate locations to the overhead rail 25 to identify the horizontal position of the bins, and to the vertical column 30 to identify the vertical position of the bins. The presence or absence of a magnetic field is sensed by sensing units, as 48, which pass in close proximity thereto. The sensing elements may, for example, be in the form of reed switches which close to give an electrical pulse output when in the presence of a magnetic field.

In FIGURE 4, a plurality of magnets in serial form defining binary numbers are attached to the overhead 25, identifying the horizontal position of the bins. It should be understood that the vertical position of the bins would be identified in a similar manner by binary number defining magnets attached to the vertical column 30. A blackened rectangle represents a small permanent magnet fastened to the rail 25, while a blank rectangle represents the absence of a permanent magnet. The sensing unit 48 illustrated in FIGURES 1 and 3 would travel in a longitudinal direction parallel to and in close proximity with the binary number defining magnets. The sensing unit 48 has a top pickup head 56 and a bottom pickup head 57. When the stacker crane is moving in a forward direction, which is the direction of the arrow 58, the top pickup head 56 will sequentially read each bit of each binary number. In order to identify the start of a binary number, a permanent magnet 60, forming no part of the binary number, read by the bottom pickup head 57, is placed just below the first and last digit of each binary number. The first binary number illustrated, having a permanent magnet, no permanent magnet, followed by two successive permanent magnets, would be read by the head 56 as 1011. Similarly, the next binary number to be read by the head 56 would be 1100, followed by the last illustrated binary number, 1101. As is well known in the art, these binary numbers represent, respectively, the decimal numerals 11, 12 and 13.

In FIGURE 5, the same binary numbers illustrated in FIGURE 4 are defined by magnets attached in parallel form to the horizontal rail 25. Since the binary number representing the decimal numeral zero is not used, every number will be defined by at least one magnetic field. The sensing unit 48 is composed of stacked pickup heads which simultaneously read the digits of the binary number. In this particular embodiment, the sensing unit 48 would require four stacked pickup heads. If there were seven bits, then seven heads would be required. No special magnets 60 are required to indicate the start of each binary number since the numbers are in parallel form and are therefore read simultaneously.

The location of the binary codes, either in serial or parallel form along the rail 25 is not critical as long as their position can be related to the corresponding horizontal position of the bin they represent. In the preferred form of the invention, the binary numbers represent the start of each bin. Thus, the horizontal position 011 of bin 54 illustrated in FIGURE 2 would correspond to a binary number attached to the horizontal beam 25 at such a location that the article fork 36 of stacker crane 23 would be inbetween bin 54 and the preceding bin, i.e., at horizontal position 88, when the binary code is read.

The exact center location of each bin 21 is indicated by small abutments 61 that are attached to one of the bottom flanges of the rail 25, as illustrated in FIGURE 6. As will hereinafter be described, a fine position sensor switch 63 contacts the abutment 61 in order to position the stacker crane accurately at the center of a bin once the desired bin has been identified by means of the binary numbers.

The small permanent magnets used to indicate the digit of a binary number could take the alternate form of small patches of radioactive paint. In such a system the sensing units would be radioactive energy detectors. Another practical system is the use of projections detected by proximity switches, as previously mentioned. Similarly, any other type of device exhibiting ON or OFF characteristics could be used, and the invention is not limited to any particular indicating device. Another device useful for high speed read out would be perforated plate scanned by air jets. When an air jet is positioned in front of a hole, a lower supply pressure results. Thus, pressure differentials could be used to signal ON or OFF conditions. Of course, conventional devices such as switches could similarly be used.

The control apparatus that positions the stacker crane at any desired location by utilizing the binary number system will now be described in detail.

Control apparatus

The control apparatus for automatically controlling the operation of the stacker crane 23 is illustrated in block diagram form in FIGURE 7. The horizontal movement control is shown in some detail. The corresponding vertical control is similar and the details are not repeated. In order to simplify the interconnections shown in FIGURES 7-11, the following conventions have been followed. Whenever two continuing lines cross each other, they are electrically connected together only if a dot has been superimposed over the point of crossing. Whenever one line terminates at another continuing line, they are always electrically connected together, regardless of whether a dot is, or is not, shown.

All external control information originates at the source of commands unit 70, which may be fed by a computer or manual input. This block 70 corresponds to a home station that is identified by a unique binary number. When the stacker crane 23 illustrated in FIGURE 1 is located at the home station, the information input unit 45 will abut a plurality of electrical input conductors 71, thereby coupling external commands to the memory units 72 and 73 housed in the logic control unit 46. In order to simplify the diagram, only a single line is shown for handling each binary number. It will, of course, be understood that as many electrical conductors as there are bits in the binary numbers used to identify the location of bins will be provided for each line. Similarly, where a single line enters a gate or other logic block, it is understood that as many gates or logic blocks will be provided as there are bits in the binary number. Once the stacker crane 23 leaves the home station and travels towards a predetermined bin, no new command information can be fed to the control apparatus, and the crane moves in accordance with the stored control information.

The warehouse may have receiving and outgoing stations, where articles are handled on belt conveyors. The control apparatus could, in a typical warehousing operation, cause the stacker crane to travel to an incoming or receiving station, which would be identified by a unique address. After picking up an article, the crane would travel to a predetermined bin, and deposit the article therein. The crane would then travel to a new bin and retrieve the article stored therein, carrying it to an outgoing station. After depositing the article at the outgoing station, the crane would return to its home station. Of course, the home station could be located anywhere in the warehouse, as for example, at the receiving station, and it is not necessary that a separate trip be made to the home station merely to receive new commands.

The stacker crane 23 moves toward a predetermined bin at a fast speed of traverse. When the sensing units 48 and 49 detect a location just preceding the location of the predetermined bin, the crane begins a slow traverse speed. When the exact position of the desired bin is detected, the stacker crane stops. Immediately thereafter the forks 36 operate to store or retrieve an article, and the stacker crane is then ready to travel to the next bin stored in its memory unit or return to home.

Since each bin is identified by a unique address composed of two binary numbers indicating the bin's horizontal and vertical position in space, memory 72 stores two binary numbers for every address. For every address fed into the address memory 72, a command is fed into the function memory 73. This command or code indicates whether the crane is to store or retrieve an article from the identified bin. Furthermore, this code will also identify on which side of the aisle, viz right or left, the desired bin is located after its horizontal and vertical position has been reached, causing the fork 36 to extend to the left or to the right, thus allowing a single stacker crane to service two racks of bins identified by a single horizontal and vertical co-ordinate system. The last binary number stored in the memory 72 is always the address of the home station.

After all the desired control commands are fed into the memories 72 and 73, a signal sent over the line 74 activates a cycling means in the form of a sequence control unit 75, producing an output at 76. This output 76 causes both the first address and the home station address stored in the memory 72 to be fed through leads 77 and 77' to the horizontal control unit 80 and the vertical control unit 80'. The horizontal binary numbers of the addresses are fed to the horizontal control unit 80, while the vertical binary numbers of the addresses are fed to the vertical control unit 80'. Control units 80 and 80' are composed of similar circuitry and operate in a similar manner, and only the horizontal control unit 80 will be described in detail.

Lead 77 couples the two horizontal binary numbers corresponding to the first bin and the home station to the direction control 82 which in turn determines the direction the first bin is located from the present position of the stacker crane, i.e., the home station. An output through a lead 83 from direction control 82 indicates whether the motor 26 of FIGURE 1 is to drive the stacker crane in a forward or reverse direction and is coupled to a crane drive unit 85, which includes the motor 26. The output through the lead 83 causes the motor 26 of FIGURE 1 to operate at a high speed traverse in either a forward or reverse direction.

As the stacker crane moves in a horizontal direction, the indicia sensor 48 passes the magnets defining binary numbers attached to the horizontal guide rail 25 of FIGURE 4. These sensed binary numbers are fed to a position comparator unit 86. The binary number of the first destination, from the memory 72, is also fed to the comparator 86. The position comparator 86 has two different types of operation, depending upon whether the stacker crane is being driven in a forward or a reverse direction. Its operation can best be explained by referring to FIGURE 2. Bin 54, identified by the horizontal binary number 011, will be assumed to be the first bin. As was explained earlier, the binary numbers are not associated with the mid-portion of each bin, but rather with the start of each bin. Therefore, binary number 011 would be located on the horizontal guide rail 25 at a position corresponding to a vertical plane or line 88, i.e., the start of bin 54. The end of bin 54, indicated by line 89, would correspond to binary number 100, i.e., the start of the next bin. If the stacker crane is moving in the forward direction, bin 54 will be identified by the binary number 011. However, if the stacker crane is traveling in the reverse direction, indicated by the arrow at 52, the start of bin 54 will now be indicated by the binary number at line 89, viz, 100. Therefore, when the stacker crane is traveling in the reverse direction, the position comparator 86 increases the stored binary number by one in order to indicate the beginning of the desired bin.

Returning to FIGURE 7, if the control unit 82 has an output 83' which indicates that the stacker crane is moving in a forward direction, the comparator 86 will merely compare the sensed binary numbers with the stored binary number. If the output 83' indicates that the stacker crane is traveling in a reverse direction, the position comparator 86 compares the sensed binary numbers with the stored binary number increased by one. When the two binary numbers match, indicating that the article fork 36 is at a point just preceding the first bin, the comparator 86 produces an output fed to a drive control unit 90. The control unit 90 in turn causes the motor 26 in the drive unit 27 to assume its slow speed operation.

The stacker crane is exactly positioned in front of the desired bin by means of a fine position sensor 63 which detects the location of an abutment 61 illustrated in FIGURE 6. The fine position sensor 63 includes a switch which is actuated when its arm 63a strikes the abutment 61. As seen in FIGURE 7, a signal from the sensor 63 is connected with the drive control 90 for the crane drive 85. The fine position sensor 63 controls the drive unit 85 only when the stacker crane is moving at its slow speed, i.e., the crane is immediately adjacent its destination. When the switch is actuated, the motor 26 in the drive unit 27 is electrically braked while the disc brake is actuated, thereby immediately stopping the horizontal motion of the stacker crane. When the crane is stopped, the article forks 36 will be positioned to enter the bin.

A signal indicating actuation of the fine position sensor 63 is coupled from control unit 90 to the sequence control 75. When the sequence control 75 receives a signal from both the horizontal control 80 and the vertical control 80', indicating that the article fork 36 is correctly positioned at the desired bin, it generates a signal at output lead 92. This signal gates the function memory 73, causing the correct code stored therein to be fed to the crane control 93. As previously described, the control unit 93 is programmed to effect one of two modes of operation. One mode causes the article fork 36 to extend in a low position and retract in a high position (article retrieval), while the other mode causes the fork 36 to extend in a high position and retract in a low position (article deposit).

When a cycle of operation of the fork 36 is completed, as indicated by the retraction of the article fork, a signal is produced which steps the sequence control 75 to provide an output at 76. The output at 76 in turn, actuates the address memory 72 causing numbers indicating the location of the stacker crane and the location of the destination to be coupled to the directional control unit 82 of the horizontal control 80 and to the comparable unit of the vertical control 80'. After the crane has completed the last warehousing operation stored in the memories 72 and 73, the sequence control 75 gates the address of the home station to the control unit 82, causing the stacker crane to return to its home station for a new set of instructions.

Figure 8:
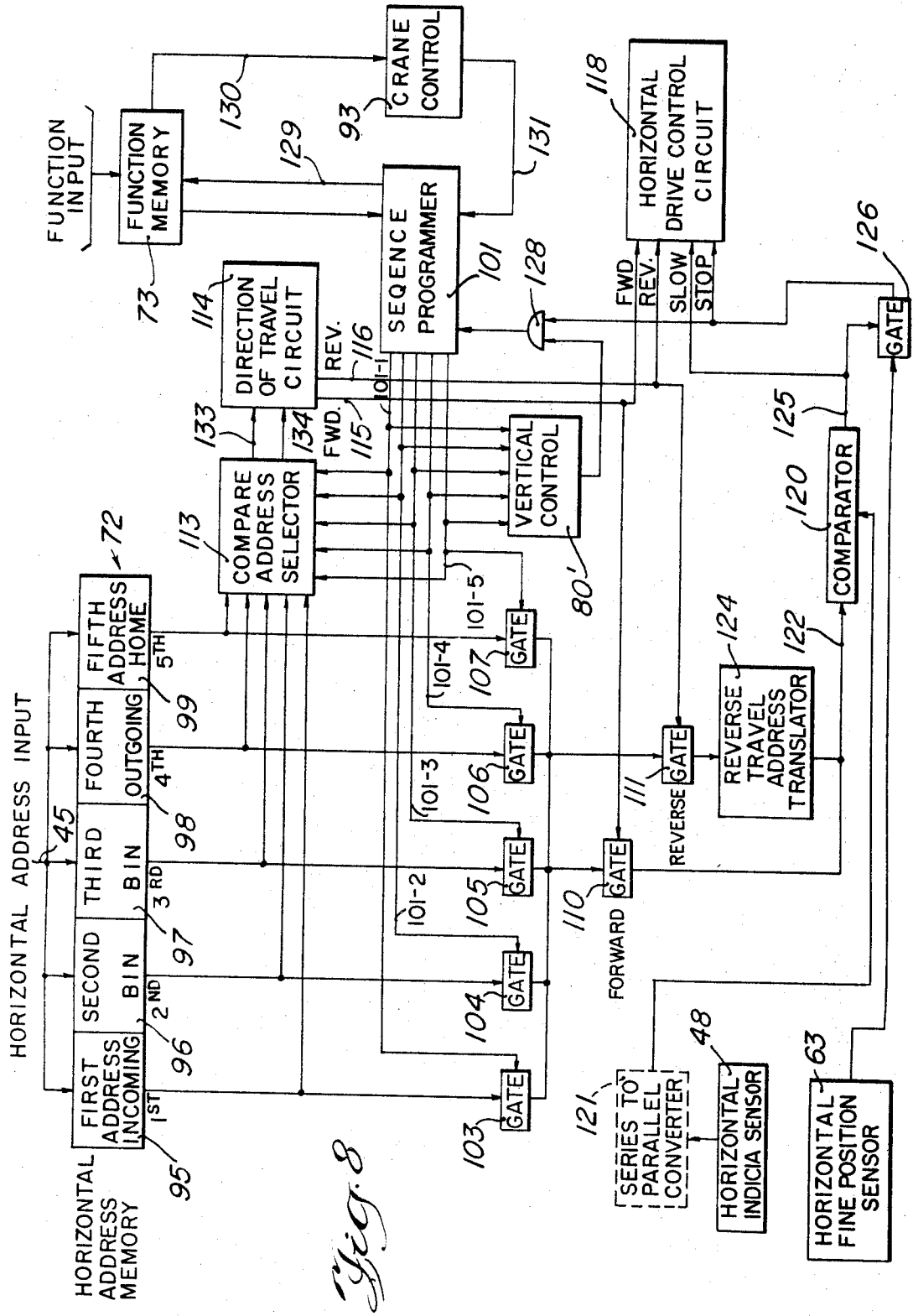
FIGURE 8 is a block diagram illustrating in more detail the command apparatus contained within the dotted lines shown in FIGURE 7.

The control apparatus illustrated in FIGURE 7 is diagrammed in more detail in FIGURE 8.

The horizontal portion of the address memory 72 can receive and store five separate binary numbers. These binary numbers are stored in a plurality of memory units 95, 96, 97, 98 and 99. Each memory unit may consist of a series of bistable elements, e.g., relays or flip flops, one for each digit of the binary number. Each memory unit can be cleared by the last output of the sequence control 75 in anticipation of new information to be received at the home station.

A sequence programmer 101, a part of sequence control 75, has five outputs which are established, one at a time in sequence. The output terminals are labeled in the order the output signals occur by the numbers 101–1, 101–2, 101–3, 101–4 and 101–5 in FIGURE 8. A plurality of normally closed gates 103, 104, 105, 106 and 107 are respectively connected to the individual memory units 95 through 99 of the horizontal memory 72. The various gates illustrated in these and the remaining diagrams are all opened when activated by an electrical pulse. After the address memory 72 has received and stored the horizontal binary numbers, the sequence programmer 101 produces a pulse output on line 101–1. The pulse at 101–1 opens the gate 103, coupling the number stored in the memory 95 to the inputs of both a forward gate 110 and a reverse gate 111. The pulse on line 101–1 is also fed to a compare address selector 113, which is part of the direction control 82. The selector 113 gates the current crane address, and the address of the next location to which the crane is to move from the memory 72, to the direction of travel circuit 114, which is the other portion of control unit 82 illustrated in FIGURE 7.

The circuit 114 compares the binary number representative of the crane position with the binary number representative of the next location to which the crane is to move to determine the direction of crane movement. As illustrated in FIGURE 2, the direction of increasing binary numbers has arbitrarily been defined as the forward direction of travel. Furthermore, the bins have been identified by increasing binary numbers. Therefore, a comparison of the binary numbers indicates in which direction, i.e., forward or reverse, the crane must travel to reach the next address. The crcuit 114 has an output 115 which is activated when the crane is to travel in a forward direction, and an output 116 which is activated when the crane is to travel in a reverse direction. These outputs 115 and 116 are coupled to the horizontal drive control circuit 118 which contains the horizontal motor 26 illustrated in FIGURE 1 and determines the direction the motor is operated.

The outputs 115 and 116 are also coupled to the gates 110 and 111, part of the comparator 86. If the crane is to travel in a forward direction, the output on the line 115 will open the gate 110, coupling the binary number representing the crane destination to the comparator 120. As the stacker crane moves, the horizontal indicia sensor 48 travels past the magnets defining binary numbers attached to the horizontal guide rail. If the binary numbers are in serial form, as shown in FIGURE 4, the horizontal sensor 48 is coupled to a series-to-parallel converter 121. If the binary numbers are contained in parallel form, as shown in FIGURE 5, the series to parallel converter 121 would be eliminated, and the sensed digits would be coupled directly from the sensor 48 to the comparator 120.

The comparator 120 compares the sensed binary numbers indicating the crane location with the binary number representing its destination.

The comparator 120 consists of a series of EXCLUSIVE-OR circuits, one for each digit of the binary number, feeding a multiple-input NOR gate. When the two binary numbers have identical digits, the comparator 120 has an output at 125, which indicates that the comparator inputs are identical. The output 125, is coupled to the drive control circuit 118 and the horizontal motor 26 of FIGURE 1 to change speed from the fast to the slow traverse. The output 125 also opens a gate 126 which couples the signal from the horizontal fine position sensor 63 to the control circuit 118. Therefore, when the sensor 63 contacts an abutment 61, as shown and described in connection with FIGURE 6, the motor 26 is electrically braked while the disc brake is activated, stopping the horizontal traverse of the stacker crane. The sensor 63 will be actuated every time it contacts an abutment 61, however, it is only connected to the control circuit 118 when the gate 126 is opened by a pulse from the comparator unit 120, indicating that the stacker crane has reached a horizontal location just preceding the desired bin.

When the stacker crane is moving in a forward direction, the stored binary number can be directly compared with the sensed binary numbers. Therefore, when the gate 110 is opened by the line 115, the binary number stored in the memory unit 95 is coupled to the line 122. However, as previously described, when the stacker crane is moving in a reverse direction, the stored binary number must be increased in value in order to identify the destination bin as the stacker crane approaches it from the opposite direction. Therefore, if the circuit 114 determines that the crane is to travel in a reverse direction, the output on the line 116 opens the gate 111, coupling the binary number stored in the unit 95 to a reverse travel address translator 124. As will be described in more detail, the translator 124 converts the stored binary number into a new binary number which will correctly identify the location of the predetermined bin. The output from the translator 124 is connected through the line 122 with comparator 120.

The output from the gate 126 is also fed to an AND gate 128. When the gate 128 receives an input from both the horizontal circuit just described, and a corresponding input from the vertical control circuit 80', indicating that the stacker crane has stopped its motion in both the vertical and horizontal direction, a pulse is fed to the programmer 101. When the programmer 101 receives this pulse from the AND gate 128, an output at 129 causes the function information stored in the memory 73 to be fed through a line 130 to the crane control 93. The memory 73 has five separate elements that store five functions corresponding to the five numbers stored in the units 95–99. At this time, therefore, the function corresponding to the first address is fed to the line 130, causing the article forks to extend to the right or left of the aisle and enter the bin in a high or low position, i.e., to deposit or retrieve, as described earlier. After the crane control 93 completes its cycle of operation, a signal is generated which is coupled to the programmer 101 through a line 131, thereby stepping the programmer 101 to its next output 101–2.

The output on line 101–2 from the programmer 101 opens the gate 104, coupling the horizontal address stored in the memory 96 to the inputs of the gates 110 and 111. The output on line 101–2 also causes the selector 113 to couple the destination address stored in the memory unit 96 and the present location of the stacker crane stored in the memory unit 95 to direction of the travel circuit 114, starting the next portion of the operating cycle. After the complete warehousing operation for the bin identified in the memory unit 96 is completed, the stacker crane will perform similar warehousing functions for the bins identified by the address stored in the memory units 97 and 98. After the fourth bin has been reached and the stacker crane has performed the desired warehousing function, output 101–5 of programmer 101 is activated. This output causes the home adrress, stored in the memory unit 99, to be compared with the present location of the stacker crane, stored in the memory unit 98, directing the stacker crane to the home station for a new set of commands.

*Detailed description of logic blocks*

Figure 9:
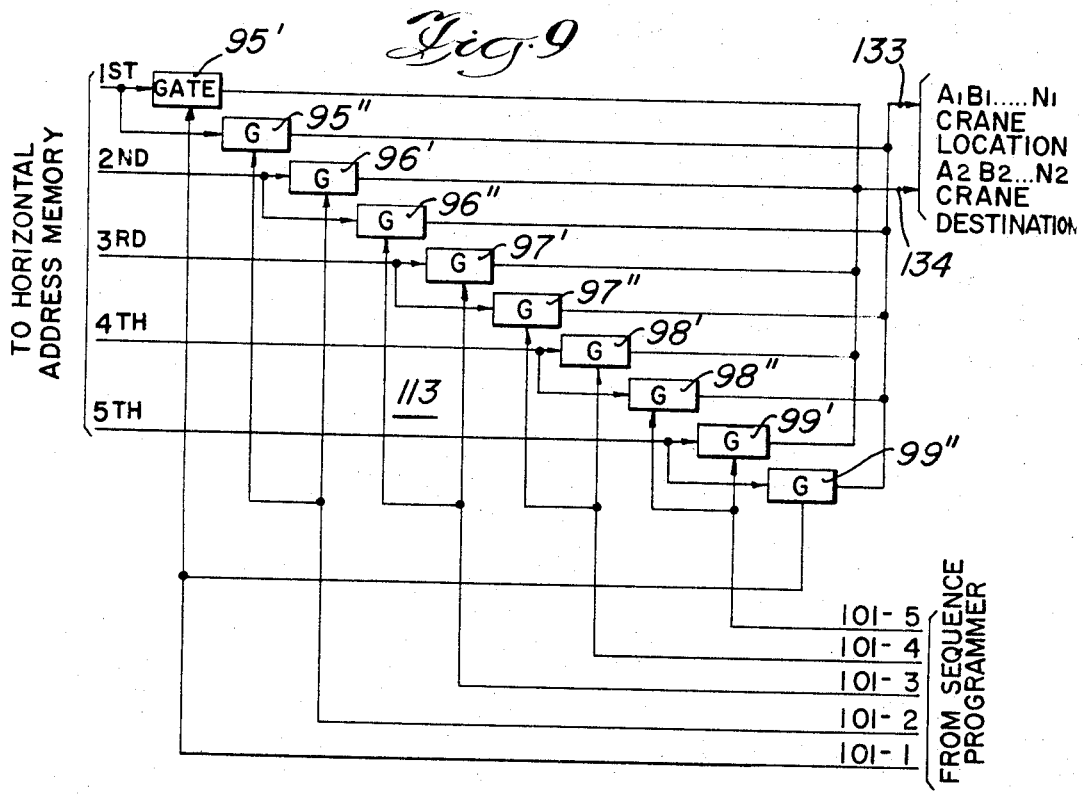
FIGURE 9 is a block diagram of the Compare Address Selector shown in FIGURE 8.
Figure 10:
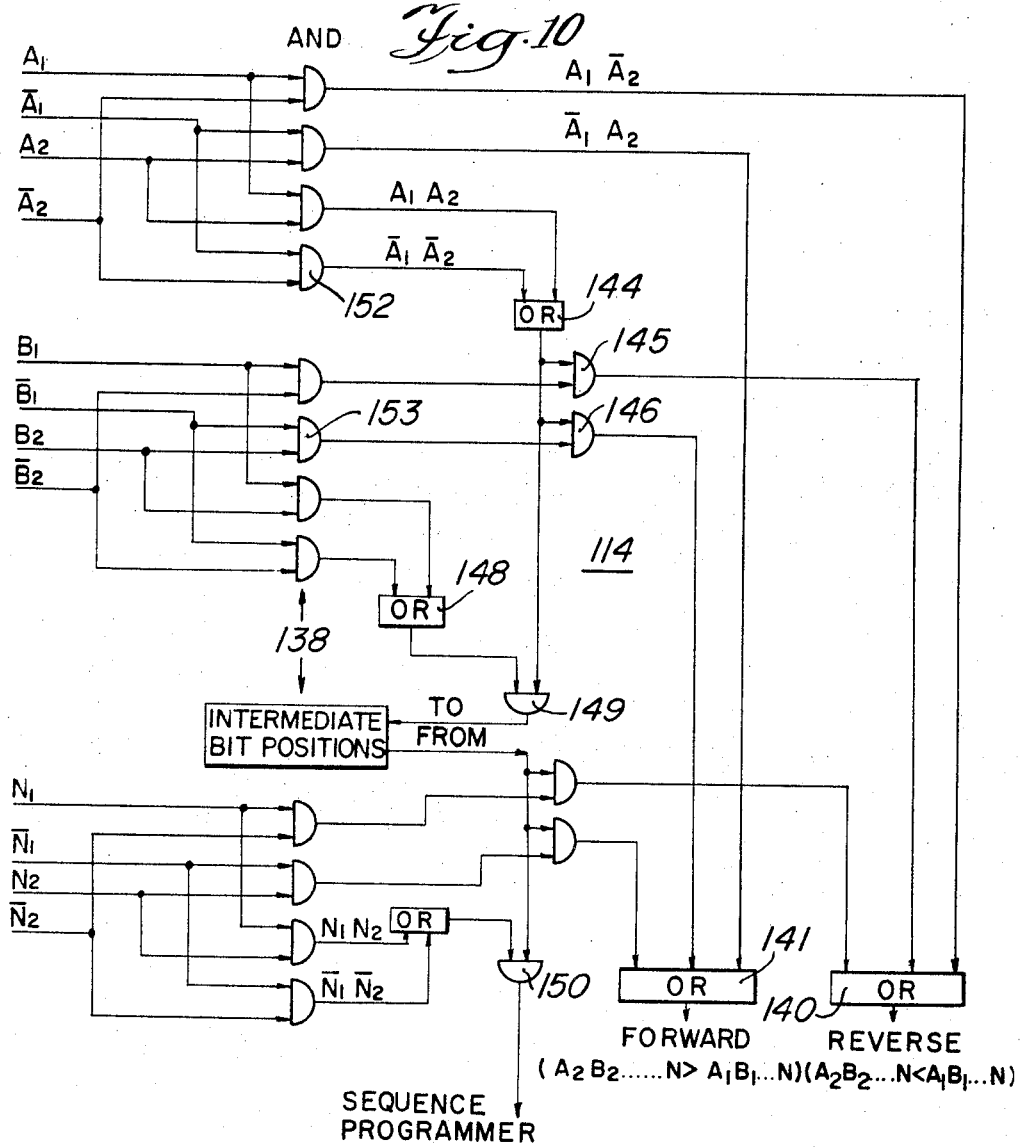
FIGURE 10 is a block diagram of the Direction Of Travel Circuit shown in FIGURE 8.
Figure 11:
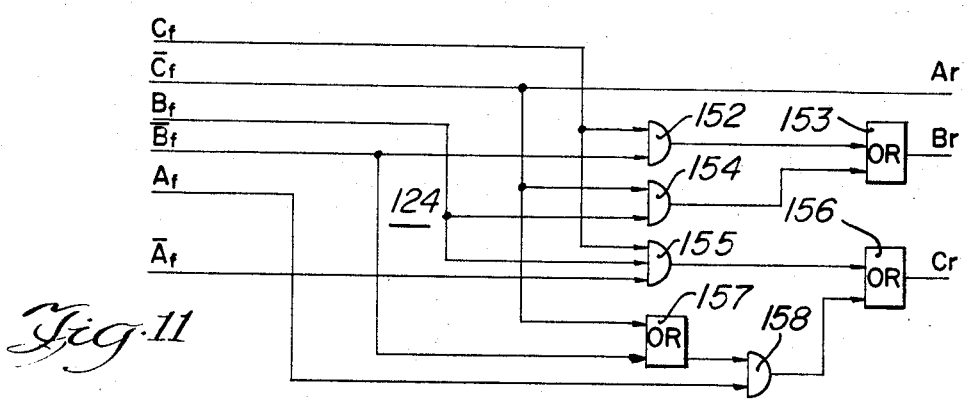
FIGURE 11 is a block diagram of the Reverse Travel Address Translator shown in FIGURE 8.

In FIGURES 9–11 three specific logic blocks discussed in connection with FIGURE 8 are shown in detail. In these figures the individual bits of a binary number are represented by the capital letters A through N, with subscripts identifying the binary number itself. The most significant bit is A and the least significant bit is N. Therefore, the horizontal binary number identifying bin 54 shown in FIGURE 2 could be written as $A_{54}B_{54}C_{54}$, with $A_{54}$ corresponding to 0, $B_{54}$ corresponding to 1, and $C_{54}$ corresponding to 1, viz, 011.

The logic block of the compare address selector 113 is illustrated in detail in FIGURE 9. The output from each of the memory units 95–99 is coupled to two gate circuits. For example, the first memory unit 95 is coupled to the gates 95' and 95", while the last memory unit 99 is coupled to the gate 99' and 99". As previously mentioned, each gate would be comprised of a plurality of sections, each handling a bit of the binary number. The gates are opened when they receive a pulse from the sequence programmer, thereby allowing the stored binary numbers to pass through to an output 133, identifying the crane location, or to an output 134, identifying the crane destination. All the gates marked with a single prime are connected to the output 134, while the remaining gates marked with a double prime are connected to the output 133. At the start of an operating cycle the sequence programmer 101 produces a pulse on output line 101–1 causing the gates 95' and 99" to open. The gate 95' couples the first stored binary number to the line 134 i.e., the crane destination, while the gate 99" connects the fifth stored binary number, viz, the home station where the crane is located, to the line 133. In a similar manner as is apparent from the diagram, the selector 113 will connect the binary number stored in the horizontal address memory 72 to the direction of travel circuit 114 when gated by the signal on lines 101–2 through 101–5 of the sequence programmer 101.

In FIGURE 10 the direction of travel circuit 114 is illustrated. The digits of the binary number on the line 133 of FIGURE 9, i.e., the present crane location, are designated with the subscript 1. The digits of the binary number on the line 134 of FIGURE 9, i.e., the crane destination, are designated with the subscript 2. Both the binary digits and their negation are fed to a series of AND logic blocks 138. The negated digits may be easily obtained from the gates of the selector 113 of FIGURE 9, which for this purpose can have a normal output and a negated output. However, it will of course be realized that the gates shown in FIGURE 9 may have a single output coupled to a NOT gate in order to obtain a negated digit.

The outputs of the AND gates 138 for the most significant digits A are shown in FIGURE 10. Similar outputs are obtained for all digits B through N–1, the diagram only illustrating the circuitry for the digits A, B, and N, it being understood that the intermediate bit positions between B and N have circuitry identical with that shown for digit B.

The circuit 114 compares the binary number $A_1B_1 \ldots N_1$ with the binary number $A_2B_2 \ldots N_2$, beginning with the most significant bit A, and continuing to examine the bits until a difference is found, at which point an output signal is obtained indicating the larger number, and hence the direction the crane should travel to reach the desired bin. Thus, in connection with digit A, an output $A_1\bar{A}_2$ indicates that $A_1$ is present and $A_2$ is not. This in turn indicates that the binary number identifying the crane location is larger than the binary number identifying the crane destination. Output $A_1\bar{A}_2$ is accordingly connected to a reverse OR gate 140. An output $\bar{A}_1A_2$ indicates that digit $A_1$ is smaller than $A_2$, i.e., the crane destination is in a forward direction, and this output feeds a forward OR gate 141.

If the two digits A have the same value, viz, 0 or 1, the direction in which the desired bin is located cannot be determined from them alone, and the next most significant digit, B, is analyzed. Therefore, either output $A_1A_2$ or $\bar{A}_1\bar{A}_2$ will be coupled through OR gate 144 to AND gates 145 and 146, which allows information concerning the B digit to pass to the forward OR gate 141 or the reverse OR gate 140. If the B digit matches, a signal through an OR gate 148, together with the signal from the OR gate 144, will open an AND gate 149, allowing information concerning the C digit to be analyzed. In a similar manner all the digits are compared until a difference is found, at which time an output signal is obtained.

In order to guard against the possibility of two stored binary numbers being exactly alike (which might indicate a mistake made at the source of commands), the special circuitry coupled with the outputs $N_1N_2$ or $\overline{N}_1\overline{N}_2$ indicate when the last two digits (and hence all preceding digits) are identical. This output coupled through an AND gate 150 will step the sequence programmer to the next memory unit, allowing the crane to continue its operation. Alternatively, this output could step the sequence programmer to its last output, causing the stacker crane to return to its home station.

To illustrate the operation of the circuit 114, it will be assumed that the crane is located at bin 001 and is to travel to bin 011. As seen in FIGURE 2, this requires the stacker crane to move in a forward direction. Digits $A_1$ and $A_2$ are both 0. Therefore, only the OR gate 152 has an output, since $\overline{A}_1\overline{A}_2$ is 1. This output is coupled through the OR gate 144 and opens the AND gates 145 and 146. At the same time, the second set of the AND gates 138 receive the B digits, wherein $B_1$ is 0 and $B_2$ is 1. Only AND gate 153, having an output $\overline{B}_1B_2$, feeds a signal to the AND gate 146. No signal is passed through the AND gate 146 until a signal is received from the OR gate 144. When this signal is received, indicating the A digit has matched, the two 1 signals thereafter cause the AND gate 146 to pass a 1 signal to the forward OR gate 141, therefore producing a signal indicating that the desired crane location is in a forward direction.

In FIGURE 11 the reverse travel address translator 124 shown in FIGURE 8 is illustrated in detail. As described earlier, when the crane is traveling in the reverse direction the stored binary number must be converted to a new binary number. This is true whether series or parallel form scan is employed. If parallel scan is used, a conventional logic circuit which merely adds one to the stored binary number may be used, and such circuits are well known in the art. An additional problem is encountered if serial scan is used, as can be seen in connection with FIGURES 2 and 4. Binary number 011, located at the line 88, is the number fed into the horizontal memory unit in order to identify the bin 54. However, if the crane is traveling in a reverse direction, as illustrated by the arrow 52, the binary number located at the line 89 is the one now preceding the desired bin, viz, 100. However, the sensing unit on the crane is moving from the right to the left as viewed in FIGURE 2, and therefore the sensing unit will read the binary number at the line 89 as 001. Thus, the translator 124 shown in FIGURE 11 both adds one to the binary number and reverses the order of the significant figures. A subscript $f$ indicates the binary number used in the forward direction, while a subscript $r$ indicates the binary number used in the reverse direction.

The following tabulation of binary numbers indicates for a serial form of scan the new binary number $A_rB_rC_r$ is formed in the translator 124 when fed with the number $A_fB_fC_f$. When the stacker crane moves in a forward direction, the sensing unit reads the binary number identified by the subscript $f$ from left to right. When the stacker crane moves in a reverse direction, the sensing unit reads the binary number identified by the subscript $r$ from right to left. By way of illustration, only, a series of binary numbers with three digits are translated below:

| $A_fB_fC_f$ | $A_rB_rC_r$ |
|---|---|
| 0 0 0 | 1 0 0 |
| 0 0 1 | 0 1 0 |
| 0 1 0 | 1 1 0 |
| 0 1 1 | 0 0 1 |
| 1 0 0 | 1 0 1 |
| 1 0 1 | 0 1 1 |
| 1 1 0 | 1 1 1 |

Any translator 124 may be used, such as the one illustrated by way of exemplification in FIGURE 11, which solves the following Boolean algebra equations:

$$A_r = \overline{C}_f$$

$$B_r = \overline{B}_f C_f + B_f \overline{C}_f$$

$$C_r = \overline{A}_f B_f C_f + A_f (\overline{B}_f + \overline{C}_f)$$

To illustrate the operation of the translator 124, the binary number 010 will be converted by the logic circuitry shown in FIGURE 11. The first output $A_r$ is the negation of $C_f$, therefore, since $C_f$ is 0, $C_r$ is 1. Into an AND gate 152 is fed $C_f$, i.e., 0, and $\overline{B}_f$, i.e., 0. Therefore, the output of the AND gate 152 is 0, which has no effect on the OR gate 153. Into an AND gate 154 is fed $\overline{C}_f$, i.e., 1, and $B_f$, i.e., 1. Therefore the AND gate 154 has a 1 output which is gated through the OR gate 153, producing a 1 at $B_r$. Into an AND gate 155 is fed $C_f$, i.e., 0, $B_f$, i.e. 1, and $\overline{A}_f$, i.e. 1. Therefore the AND gate 155 has a 0 output which does not effect an OR gate 156. An OR gate 157 is fed with $\overline{C}_f$, i.e., 1 and $\overline{B}_f$, i.e. 0. Therefore the OR gate 157 feeds a 1 output to an AND gate 158 which is also fed with $A_f$, i.e., 0. Thus the AND gate 158 has a 0 output. Since the OR gate 156 is fed with two 0 outputs, its output A is also 0. The resulting binary members, sensed as the sensing unit moves in a reverse direction, will be read as 110.

The translator 124 has been designed to add one to a binary number. Of course, if it is desired to have the stacker crane begin its slow speed traverse several bins ahead of the predetermined bin, the translator unit could be designed to accomplish this purpose following the teachings of this invention.

We claim:
1. A warehousing system comprising: a storage rack with a plurality of load-supporting means; an article conveyor travel zone adjacent said rack; an article conveyor, load handling means mounted on said conveyor to remove or deposit a load from or on a preselected one of said load-supporting means; drive means for moving said article conveyor in a first and second direction in said zone; control means for said drive means comprising means for receiving numerical data representing a predetermined location along said travel zone to decrease the speed of said article conveyor prior to reaching a selected load-supporting means in said rack; a plurality of location means disposed adjacent said load-supporting means and each embodying a coded indicia providing numerical data as to each location; sensing means mounted on said article conveyor to read each of said location means; and comparator means responsive only to a selected one of said location means detected by said sensing means to decrease the speed of said article conveyor at said location; said control means further including means operative when said article conveyor is moving in one of said directions to a location specified by the aforesaid numerical data received by said receiving means to convert at least one of the numerical data to a numerical data of a different absolute value wherein said sensing means is responsive only to a different one of said location means to decrease the speed of the article conveyor before reaching a selected load-supporting means.

2. A warehousing system as defined in claim 1 wherein said location means includes a set of binary coded unique indicia for each load-supporting means and the sets of indicia for load-supporting means have a mathematical progression indicating the relative positions in space of the load-supporting means.

3. The system of claim 2 wherein each unique indicia is formed from a plurality of bits, each bit having a different numerical significance, the sum of the numerical significance of the bits forming said unique indicia, said numerical data being composed of a plurality of bit signals respectively corresponding to the plurality of bits forming said unique indicia, and converting means adding or subtracting certain bits of given numerical significance from corresponding bits represented by said bit signals to form a new signal, whereby said new signal identifies a load-supporting means preceding said selected load-supporting means by a number of supporting means equal to the sum of the given numerical significance of said certain bits.

4. An automatic warehousing system comprising:
elongated horizontal guide means;
a self-propelled conveyor including a carriage with motor means thereon for driving said carriage along said horizontal guide means;
said carriage having elongated vertical guide means mounted thereon and extending therefrom;
a second carriage, mounted for movement along said vertical guide means;
first means for propelling said second carriage along said vertical guide means;
an elongated storage framework with a plurality of storage bins spaced horizontally along the length of a warehouse and stacked vertically on top of each other, each of said storage bins being of a size to hold skids with articles thereon, said horizontal and vertical guide means extending substantially parallel to the horizontally spaced and vertically stacked storage bins;
support means movably mounted on said second carriage for holding a skid with an article thereon;
second means for propelling said support means into and out of a storage bin, including means for depositing a skid held by said support means in said storage bin and means for removing a skid stored in said storage bin;
a plurality of separate sets of numerical binary coded indicia mounted on one of said guide means or storage framework and disposed along said storage framework for identifying horizontal positions along the framework and for decreasing the speed of said conveyor in an advance position prior to the stopping at a selected bin, each set being mounted in a spaced predetermined location relative to each bin;
apparatus for controlling the operation of said motor means for positioning said support means at a predetermined horizontal bin position, including memory means, comparator means, and a sensing unit mounted on said carriage,
said memory means having means for receiving and storing signals representing binary coded numerical indicia that identify said advanced position,
said sensing unit having a path when the carriage is propelled that is substantially parallel to said sets of binary coded indicia and having means for transmitting to said comparator means a read signal representing the separate set of binary coded indicia adjacent thereto as the sensing unit moves past;
said comparator means having means for comparing the read signal transmitted from said sensing unit with the indicia representative signals stored in said memory means, said apparatus being responsive to said comparator means when said advanced position is sensed to decrease the conveyor speed;
said apparatus further including means in addition to said sensing unit and indicia for controlling said motor means to finally position the conveyor responsive to said sensing unit having sensed the advanced position;
means controlling said first propelling means to position said second carriage, and means operable when said second carriage is positioned at said predetermined bin for operating said second propelling means.

5. The system of claim 4 wherein each of said storage bins is identified at a particular location in said framework additionally by one of a plurality of separate sets of vertically spaced unique indicia, said sensing means including a second sensing unit for reading the vertically spaced sets of unique indicia, said control apparatus being additionally responsive to said second sensing unit to propel said support means simultaneously in both a horizontal and vertical direction toward said predetermined bin.

6. A system as defined in claim 4 wherein said sets of binary coded indicia are programmed to have the bins sequenced in an order of mathematical progression to have a known position in space relative to each other.

7. A system as defined in claim 4 wherein each set of binary coded indicia are formed from indicium in serial form with each set having associated therewith at least one indicium which indicates the start of said set, and said sensing means being responsive to said one indicium for reading the remaining indicia in serial form.

8. A system as defined in claim 4 wherein said control apparatus further includes a sequence programmer, having a set of outputs continuously activated in sequence, said conveyor being propelled to a home station by one particular output of said sequence programmer.

9. An automatic warehousing system comprising:
horizontal guide means;
a self-propelled conveyor including a carriage with motor means thereon for driving said carriage along said horizontal guide means;
said carriage having vertical guide means mounted thereon and extending therefrom;
a second carriage, mounted for movement along said vertical guide means;
first means for propelling said second carriage along said vertical guide means;
a storage rack with a plurality of storage bins for holding articles therein, said horizontal and vertical guide means extending substantially parallel to said storage bins;
support means movably mounted on said second carriage for holding an article;
second means for propelling said support means into and out of a storage bin, including means for depositing an article held by said support means in a storage bin and means for removing an article stored in a storage bin;
a plurality of separate sets of numerical binary coded indicia mounted on one of said guide means or storage framework and disposed along said storage framework for identifying horizontal positions along the framework and for decreasing the speed of said conveyor in an advance position prior to the stopping at a selected bin, each set being mounted in a spaced predetermined location relative to each bin;
apparatus for controlling the operation of said motor means for positioning said support means at a predetermined bin, including memory means, comparator means, and a sensing unit mounted on said carriage, said memory means having means for receiving and storing binary coded indicia that identify said advance position, said sensing unit having a path when the carriage is propelled that is substantially parallel to said indicia, the sensing unit having means for transmitting to said comparator means the indicia which said sensing unit is moving past, said comparator means having means for comparing the indicia transmitted from said sensing unit with the indicia stored in said storage unit, said apparatus being responsive to said comparator means when said advanced position is sensed to decrease the conveyor speed;
said apparatus further including means in addition to said sensing unit and indicia for controlling said motor means to finally position the conveyor responsive to said sensing unit having sensed the advanced position;
means controlling said first propelling means to position said second carriage, and means operable when said second carriage is positioned at said predetermined bin for operating said second propelling means;

said motor means propelling said carriage in either a forward or a reverse direction along said horizontal guide means;

said binary coded indicia being composed of a plurality of bits, each bit having a different numerical significance, the sum of the numerical significance of the bits of each indicia representing a different number which identifies the horizontal position of each bin;

a first station, corresponding to the horizontal location of a desired advanced position, identified by a unique binary number;

a second station identified by a unique binary number;

said control apparatus including means for comparing the plurality of bits forming the number of the first station with the plurality of bits forming the number of the second station to determine whether said first station is located in a forward or a reverse direction relative to the location of the second station, and means responsive to the comparison means for causing said motor means to propel said carriage toward said first station.

10. A system as defined in claim 9 wherein said sets of binary coded indicia are programmed to have the bins sequenced in an order of mathematical progression to have a known position in space relative to each other.

11. The article warehousing system of claim 10 wherein said comparing means has a plurality of gate means equal in number to the plurality of bits forming said indicia, each gate means being coupled to bit signals having the same numerical significance from said establishing means and present location means for comparing said bit signals to determine a match or a mismatch therebetween to indicate the presence or the absence, respectively, of the same numerical significance in the selected bin signal and the present bin signal, circuit means including said gate means for initially comparing the bit signals having the highest numerical significance and subsequently being responsive if the compared bit signals match to compare continuously less significant bit signals until a mismatch is compared, and output means connected to said circuit means and responsive to the compared mismatch for generating said forward or reverse signal.

12. The system of claim 10 including a horizontal direction-of-travel means, said direction-of-travel means having outputs which indicate whether said first station is located in a forward or a reverse direction from said second station; a forward gate and a reverse gate associated with the direction-of-travel means; translator means for converting a first binary number into a new binary number representative of a bin located in a reverse direction from the bin associated with said first binary number, said translator means being in series with said second gate; said forward gate being connected between said memory means and said comparator means, said reverse gate and translator means being connected between said memory means and said comparing means; said forward gate being responsive to a forward output from said direction-of-travel means for coupling the binary numbers stored in said memory means to said comparing means, and said reverse gate being responsive to a reverse output from said direction-of-travel means for converting said binary numbers stored in said memory means into new binary numbers, said new binary numbers being coupled to said comparing means in order to identify said predetermined bin when said article conveyor is travelling in said reverse direction.

13. A warehousing system comprising: a storage rack with a plurality of load-supporting means; an article conveyor travel zone adjacent said rack; an article conveyor, load handling means mounted on said conveyor to remove or deposit a load from or on a preselected one of said load-supporting means; drive means for moving said article conveyor in forward and reverse directions in said zone; control means for said drive means comprising means for receiving numerical data representing a predetermined location along said travel zone to decrease the speed of said article conveyor prior to reaching a selected load-supporting means in said rack; a plurality of location means disposed adjacent said load-supporting means including a unique set of binary indicia for each of said means and the sets have a mathematical progression indicating relative positions in space; sensing means mounted on said article conveyor and responsive only to a selected one of said location means to decrease the speed of said article conveyor at said location; means operative when said article conveyor is moving in the reverse direction to convert the numerical data representing the predetermined location to a numerical data of a different absolute value wherein said sensing means is responsive only to a different one of said location means to decrease the speed of the article conveyor before reaching a selected load-supporting means.

14. An automatic warehousing system comprising: horizontal guide means;

a self-propelled conveyor including a carriage with motor means thereon for driving said carriage along said horizontal guide means;

said carriage having vertical guide means mounted thereon and extending therefrom;

a second carriage, mounted for movement along said vertical guide means;

first means for propelling said second carriage along said vertical guide means;

a storage rack with a plurality of storage bins for holding articles therein, said horizontal and vertical guide means extending substantially parallel to said storage bins;

support means movably mounted on said second carriage for holding an article;

second means for propelling said support means into and out of a storage bin, including means for depositing an article held by said support means in said storage bin and means for removing an article stored in said storage bin;

a plurality of unique indicia, each of said storage bins being identified in said storage rack by unique indicia attached to said horizontal guide means for identifying the horizontal position of said bin and unique indicia attached to said vertical means for identifying the vertical position of said bin;

apparatus for controlling the operation of said motor means and said first propelling means for positioning said support means at a predetermined bin, and for controlling the operation of said second propelling means for depositing articles in said predetermined bin and for removing articles from said predetermined bin, including memory means, comparator means, a first sensing unit mounted on said carriage and a second sensing unit mounted on said second carriage, said memory means having means for receiving and storing unique indicia that identify the vertical and the horizontal position of said predetermined bin, said sensing units having a path when propelled that is substantially parallel to said unique indicia, each having means for transmitting to said comparator means the indicia which said sensing units are moving past, said comparator means having means for comparing the indicia transmitted from said sensing units with the indicia stored in said storage unit, said apparatus being responsive to said comparator means when the horizontal location of said predetermined bin is sensed to control said motor means for positioning said carriage, said apparatus being further responsive to said comparator means when said vertical location is sensed to control said first propelling means to position said second carriage, means operable when said second carriage is positioned at said predetermined bin for operating said second propelling means;

wherein said motor means has a first and second speed control means for propelling said carriage at a first or second speed along said horizontal guide means, said first speed being faster than said second speed; said comparator unit including a third speed control means for controlling said first and second speed control means, said third control means normally responsive to maintain said motor means at said first speed and further responsive to said control means when a predetermined distance preceding the location of said predetermined bin is sensed by said sensing units for causing said motor means to respectively assume said second speed;

wherein each of said bins have abutment means associated therewith, said self-propelled conveyor having means for detecting said abutment means; and braking means associated with said motor means, responsive to the detection of abutment means when the carriage is moving at said second speed for abruptly stopping said carriage, thereby positioning said second carriage at said predetermined bin.

References Cited

UNITED STATES PATENTS

| | | | |
|---|---|---|---|
| 2,988,237 | 6/1961 | Devol | 214—16.4 |
| 3,076,566 | 2/1963 | Dennis | 214—16.4 |
| 3,086,121 | 4/1963 | Cockrell | 214—16.4 |
| 3,140,009 | 7/1964 | Wallace | 214—16.4 |
| 3,139,994 | 7/1964 | Chasar | 214—16.4 |
| 3,168,053 | 2/1965 | Miroux | 104—88 |
| 3,173,533 | 3/1965 | Zuck | 104—88 |

HUGO O. SCHULZ, *Primary Examiner.*

R. B. JOHNSON, *Assistant Examiner.*